UNITED STATES PATENT OFFICE.

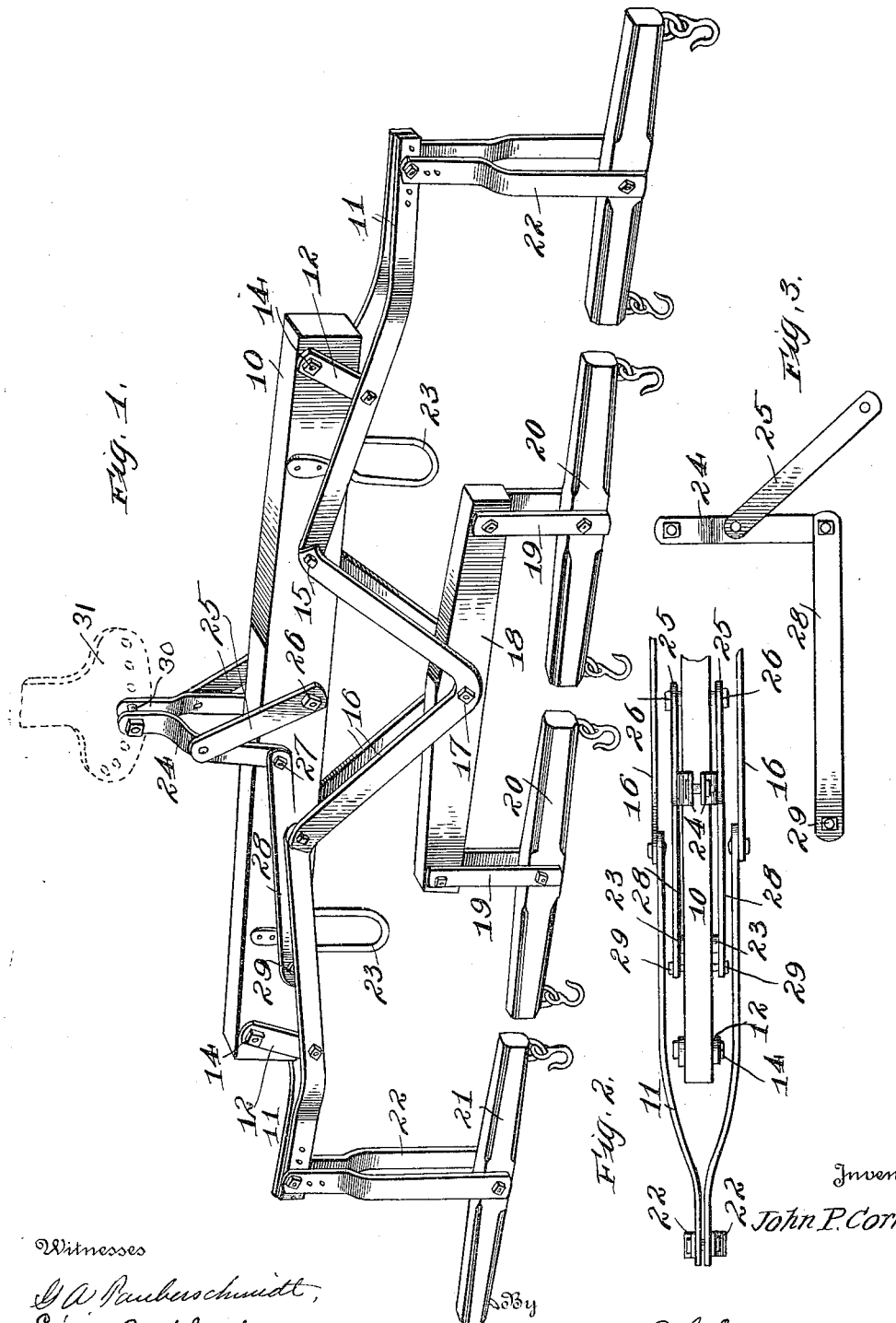

JOHN PAULUCCI CORMODE, OF CHATHAM, ONTARIO, CANADA.

CLEVIS ATTACHMENT FOR DRAFT-EVENERS.

1,142,148.  Specification of Letters Patent.  Patented June 8, 1915.

Application filed March 30, 1914. Serial No. 828,940.

*To all whom it may concern:*

Be it known that I, JOHN P. CORMODE, a subject of the King of Great Britain, and a resident of the city of Chatham, in the county of Kent, in the Province of Ontario, Canada, have invented a Clevis Attachment for Draft-Eveners, of which the following is a specification.

This invention relates to certain new and useful improvements in eveners, and is an improvement upon eveners of the type shown, described, and claimed in U. S. Letters Patent No. 1,038,725, granted to me September 17, 1912.

The object of the present invention is mainly to provide a clevis attachment for eveners that can be applied to any evener, either of the three or four-horse type.

A further object of the invention is to provide an evener so constructed as to make it less possible for any horse not to have its share of the draft.

With the above and other objects in view, the invention resides in the novel construction, combination, and arrangement of parts, as will be hereinafter more specifically described and then claimed, and in describing the invention in detail, reference is had to the accompanying drawing forming a part of this specification, and wherein like numerals of reference indicate like parts throughout the different views, in which:—

Figure 1 is a perspective view of a four-horse evener constructed in accordance with my invention, with the off-set clevis attached thereto. Fig. 2 is a top plan view partly broken away, and, Fig. 3 is a view in side elevation of the off-set clevis detached from the evener bar.

In the embodiment of the invention herein shown, I have illustrated the off-set clevis as applied to an evener adapted for use in connection with four horses, but do not wish by this illustration, to be understood as limiting myself to an evener of this particular type, since such clevis may be as readily applied to an evener of the three horse type if desired.

The evener bar 10 carries at each end, an auxiliary evener bar 11. In practice, each auxiliary evener bar 11 comprises two bars, one on each side of the evener bar to provide two side members which are connected intermediate their ends as by straps 12 and bolts 14 to the evener bar 10 adjacent the ends of the latter.

The inner ends of the side members of the auxiliary evener bars 11 are connected as at 15 to the ends of substantially V-shaped evener levers 16, one of which, like the side members of the auxiliary evener bars, lies on one side of the evener bar 10 and the other of which levers is on the other side of said evener bar 10.

The evener levers 16 have pivotally-connected thereto as at 17, a double tree 18 which carries by means of straps 19 or any other suitable means, swingle trees 20. The remaining two swingle trees 21 of a four horse evener are connected by straps 22, or other suitable means to the auxiliary evener bars 11 adjacent the outer ends of the latter.

The evener bar 10 is preferably provided with loops 23 which act as guards to prevent the auxiliary evener bars 11 from coming in contact with the evener bar 10.

The off-set clevis attachment comprises a clevis member 24, each side strap or member of which is connected by side straps or links 25 to the evener bar 10, as at 26. The inner ends of the side members of the clevis 24 overlie the evener bar 10 and are pivotally connected as at 27 to the inner ends of auxiliary evener levers 28 that are pivotally attached at their outer ends as at 29 to the evener bar 10.

The clevis or connecting member 22 for each swingle tree 21 is capable of being adjustably connected to the auxiliary evener bars 11.

The free ends of the plates or straps 24 are perforated for the reception of a bolt or the like 30 by means of which the off-set clevis may be connected pivotally to the member 31 usually formed on or attached to an agricultural implement.

With the construction of a four horse evener, as shown and described, it is to be observed that there is but one double tree used, the other two swingle trees being connected direct to the auxiliary evener levers. This provides for plenty of space for each horse to work in, and resulting in an even draft on each of the four horses. By making the evener shorter in length and applying the off-set clevis, it is possible to work one horse in the furrow when plowing, and the remaining three horses on the unplowed land. The off-set clevis attachment may be used in connection with any form of evener desired.

What I claim as new is:—

1. A clevis attachment for draft eveners comprising two spaced elongated plates, a link pivoted to one end of each of said plates, the other end of each of said plates being formed to receive a means for single point pivotal connection to an agricultural implement, and a relatively shorter link pivoted to each of said plates centrally between the ends thereof, the points of connection of both links on each plate being in substantial longitudinal alinement with respect to said plates, and the free ends of all of said links being adapted for suitable pivotal connection to an evener bar.

2. The combination with an evener bar, of a clevis attachment therefor comprising links pivotally connected to opposite sides and near one end thereof, relatively shorter links pivotally connected to opposite sides and centrally of said evener bar, spaced plates having off-set portions adapted to straddle said evener bar, said plates each being pivotally connected at one end to one end of one of said first-mentioned links and each of said shorter links being pivotally connected to one of said plates intermediate the ends thereof, the points of connection of all of said links on said plates being in longitudinal alinement with respect to said plates, and means carried by the free ends of said plates for a single point connection to an agricultural implement.

In testimony whereof, I have signed in the presence of the two undersigned witnesses.

JOHN PAULUCCI CORMODE.

Witnesses:
E. A. BEDFORD,
P. J. EDMUNDS.

Copies of this patent may be obtained for five cents each, by addressing the "Commissioner of Patents, Washington, D. C."